United States Patent [19]

Koehler et al.

[11] Patent Number: 4,828,022

[45] Date of Patent: May 9, 1989

[54] HEAT CONDUCTING SLEEVE

[75] Inventors: Charles W. Koehler, Milpitas; Gerrit VanOmmering, San Francisco, both of Calif.

[73] Assignee: Ford Aerospace & Communications Corporation, Detroit, Mich.

[21] Appl. No.: 403,823

[22] Filed: Jul. 30, 1982

Related U.S. Application Data

[60] Continuation of Ser. No. 198,394, Oct. 20, 1980, abandoned, which is a division of Ser. No. 127,160, Mar. 4, 1980, Pat. No. 4,284,690.

[51] Int. Cl.$^4$ .............................................. F28F 7/00
[52] U.S. Cl. .................................... 165/185; 165/147
[58] Field of Search ................ 165/147, 177, 179, 185

[56] References Cited

U.S. PATENT DOCUMENTS

| | | | |
|---|---|---|---|
| 2,458,189 | 1/1949 | Morgan | 165/147 |
| 2,973,400 | 2/1961 | McAdam | 165/185 |
| 3,312,277 | 4/1967 | Chitouras et al. | 165/185 |
| 3,333,123 | 7/1967 | Baumann | 165/147 |
| 3,738,422 | 6/1973 | Economos et al. | 165/185 |
| 4,470,709 | 9/1984 | Koehler et al. | 165/147 |

Primary Examiner—Albert W. Davis, Jr.
Assistant Examiner—John K. Ford
Attorney, Agent, or Firm—Edward J. Radlo; Keith L. Zerschling

[57] ABSTRACT

The disclosed invention is a device and method for optimizing the weight and/or the heat transfer (conduction) capability of a heat transfer cylindrical sleeve. The sleeve is designed to fit around a cylindrical heat source. One particular application for this invention is where the heat source is a battery such as a metal gas battery in a satellite (where weight savings is important). Two sets of functional relationships are generated showing the relationship between the thickness of the sleeve at its top and bottom, an "area factor" (which is directly proportional to its heat transfer capability), the material thermal conductivity, and its volume per unit length (which is directly proportional to its weight). One can specify the desired heat transfer capability of the sleeve and optimize (minimize) its weight. Conversely, one can specify the desired weight for the sleeve and optimize (maximize) its heat transfer capability. Assuming that the heat source has a uniform heat generating propensity along its cylindrical surface, the optimum shape for the sleeve is tapered with dimensions as described herein.

2 Claims, 3 Drawing Sheets

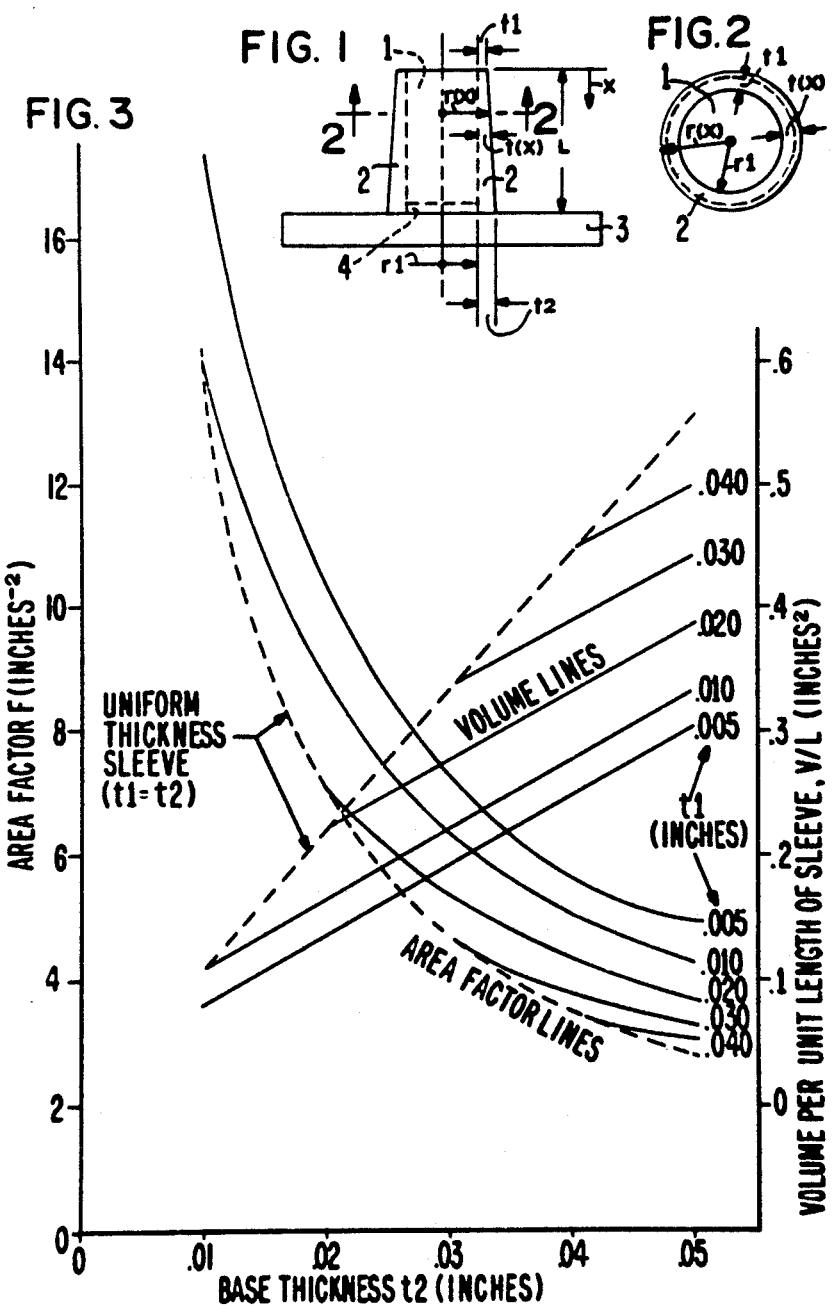

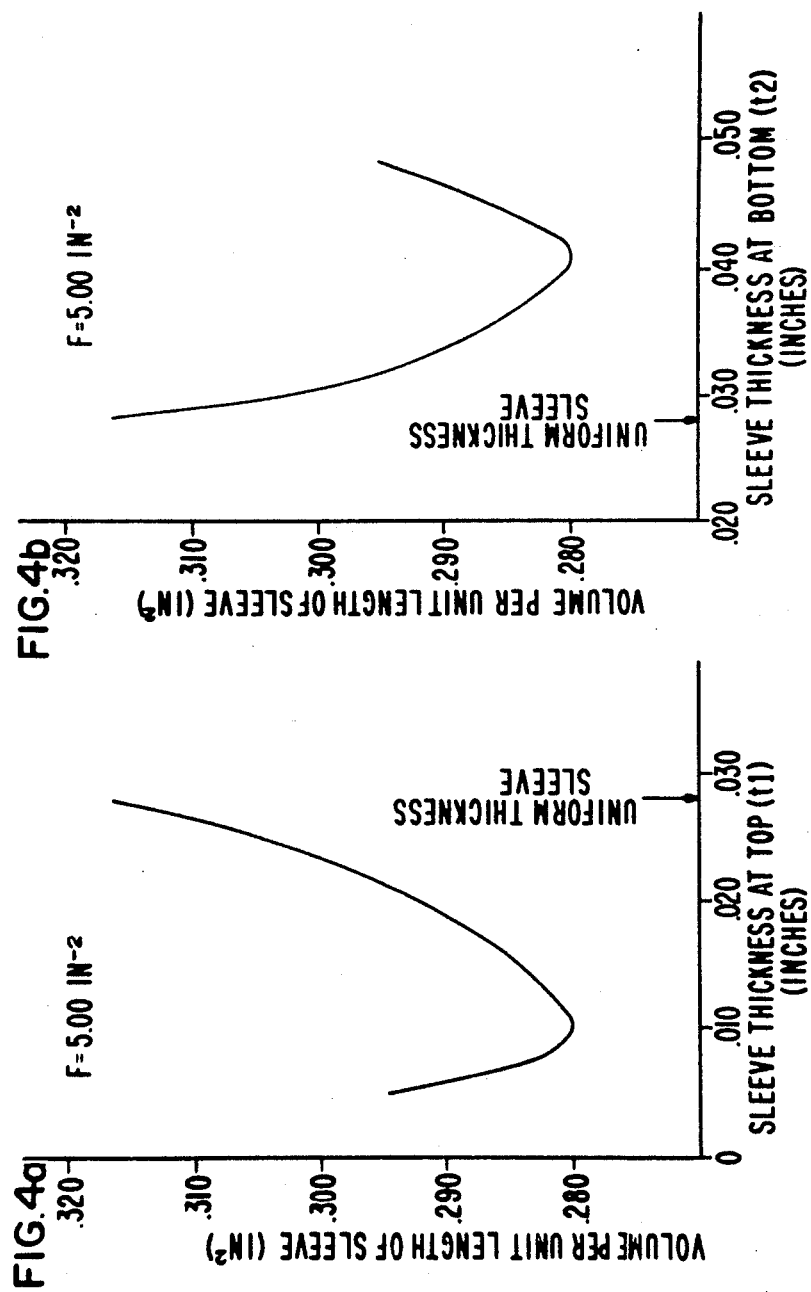

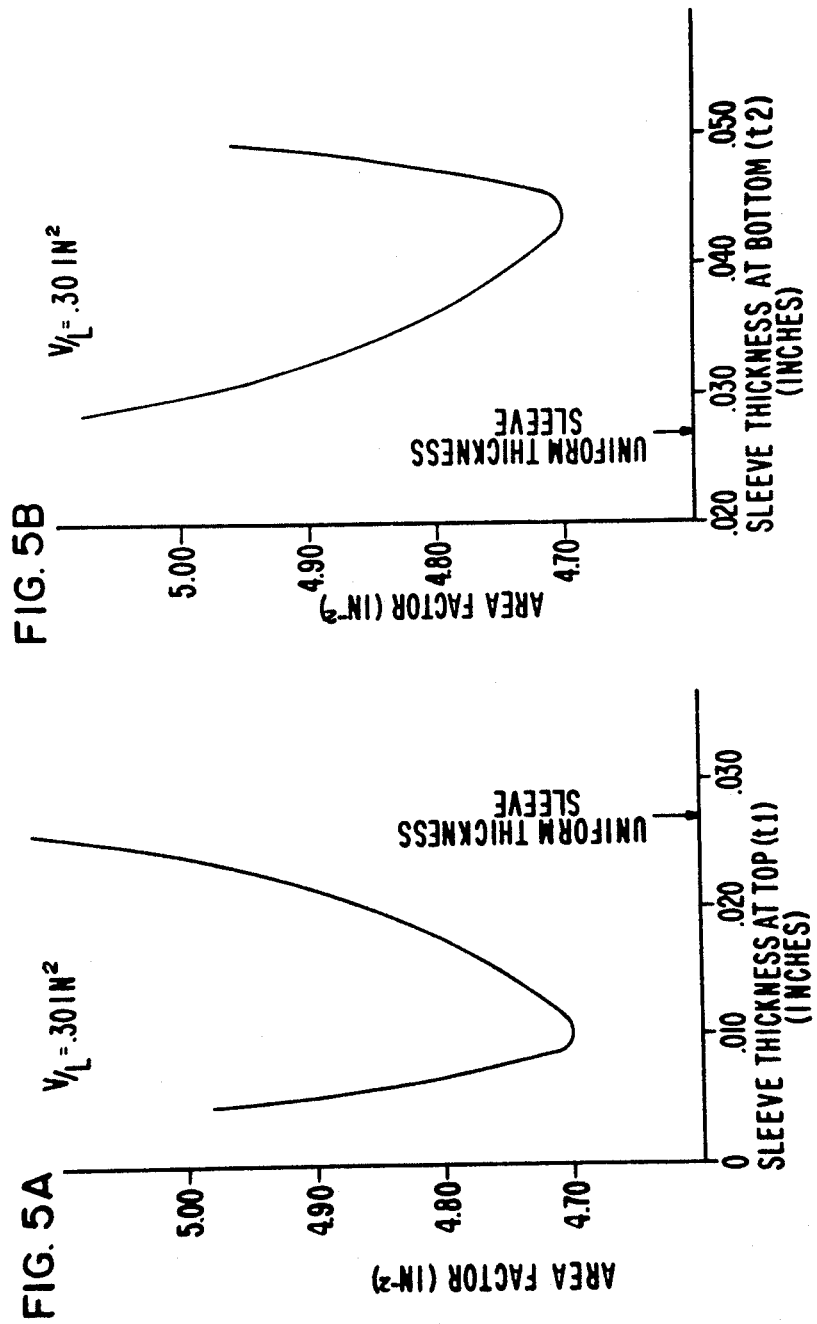

HEAT CONDUCTING SLEEVE

This is a continuation of application Ser. No. 198,394, filed Oct. 20, 1980, now abandoned which is a division of Ser. No. 127,160, filed Mar. 4, 1980, now U.S. Pat. No. 4,284,690.

BACKGROUND OF THE INVENTION

1. Field of the Invention

This invention is a device and a method for providing a weight and heat transfer optimized cylindrical sleeve designed to fit around a cylindrical heat source. A particular application, where weight savings as well as heat transfer capability is important, is where the heat source is a battery for use in a satellite, such as a metal gas battery.

2. Description of the Prior Art

A prior art search was conducted and disclosed the following U.S. patent references.

U.S. Pat. Nos. 266,220, 1,657,202, 2,146,541, 2,156,063, 2,181,927, 2,708,213, and 3,269,866 disclose tapered heat transfer walls; however, they do not show, as does the present invention, how to optimize the heat transfer capability of the wall for a fixed wall weight, or optimize the wall weight for a fixed heat transfer capability.

Secondary references are U.S. Pat. Nos. 954,119, 1,506,278, 2,894,622, 2,933,292, 3,110,634, and 3,607,403.

SUMMARY OF THE INVENTION

The present invention is a device and a method for providing a heat transfer and weight optimized sleeve having a cylindrical inner diameter designed to fit around a cylindrical heat source having substantially uniform heat generating propensity along its cylindrical surface.

This is a difficult problem of thermal control because normally when one wishes to maximize the heat transfer (conduction) capability of such a sleeve, one makes the sleeve walls as thick as possible, resulting in an increase in the sleeve weight. In many applications, e.g., where the sleeve surrounds a battery, such as a metal gas battery, e.g., for use in a spacecraft, this weight increase becomes critical. Thus, one must seek the optimum tradeoff between heat transfer capability of the sleeve and its weight for a given application.

This invention shows how one may specify the heat transfer capability of the sleeve and minimize its weight, or, conversely, specify the weight of the sleeve and maximize its heat transfer capability.

Two sets of functional relationships are generated which may be portrayed on the same graph. These curves portray the relationship between four variables: $t_1$, the thickness of the sleeve at its upper end; $t_2$, the thickness of the sleeve at its lower end; F, an "area factor" linearly proportional to $\Delta T$, the temperature differential between the top and the bottom of the sleeve (and therefore inversely proportional to the heat transfer capability); and V/L, the volume of the sleeve divided by its length, which is linearly proportional to W, the weight of the sleeve.

If one specifies either $t_1$ or $t_2$, plus either F or V/L, then one obtains from these curves the other two variables. One may use this technique to specify the $\Delta T$ and then by letting one of the t's vary, determine at which point the weight will be the lowest. Conversely, one may specify the weight and determine at which $t_1$ or $t_2$ the heat transfer capability will be greatest ($\Delta T$ the lowest).

BRIEF DESCRIPTION OF THE DRAWINGS

These and other more detailed and specific objects and features of the present invention are more fully disclosed in the following specification, reference being had to the accompanying drawings, in which:

FIG. 1 is a side view of a heat source and the cylindrical sleeve of the present invention defining its parameters;

FIG. 2 is a cross-sectional view of the apparatus of FIG. 1 taken along the line "2—2";

FIG. 3 is a graph of calculated data illustrating the relationships, by means of two sets of curves, among four variables, $t_1$, $t_2$, F, and V/L;

FIGS. 4a and 4b are two graphs of calculated data showing, for fixed F, V/L as a function of $t_1$ (FIG. 4a) and $t_2$ (FIG. 4b); and FIGS. 5a and 5b are two graphs of calculated data showing, for a fixed V/L, F as a function of $t_1$ (FIG. 5a) and $t_2$ (FIG. 5b).

DESCRIPTION OF THE PREFERRED EMBODIMENTS

Referring to FIGS. 1 and 2, cylindrical heat source 1 is assumed to have a uniform propensity for generating heat at all points along its cylindrical surface, x is the distance along the longitudinal axis of source 1, with x=0 at the top of the heat source. The length of the heat source is L, so that x=L at its bottom.

In the preferred embodiment, heat source 1 is a battery cell. This battery cell may be located in a spacecraft, and supplies electrical power therefor. In such an environment, weight savings is critical. The battery cell may be a metal-gas cell comprising a pressurized container enclosing two reactants. The first reactant is a gas, e.g., hydrogen. The second reactant is a metal plus its oxide, or hydrated metal oxides. Typical materials are silver plus silver oxide, or hydrated nickel oxide.

Surrounding heat source 1 and in intimate contact therewith is a roughly cylindrically shaped sleeve 2 fabricated of metal or other suitable heat conducting material, and having uniform (i.e., linear) taper from top to bottom. As used herein "taper" is the change in sleeve thickness per unit length, x. It is further assumed that the amount of any such "taper" is nonzero. Preferred materials for sleeve 2, particularly where weight savings are important, are aluminum and magnesium alloys. Since the sleeve is designed to remove heat from source 1 to a heat conducting base plate 3 in intimate contact with the bottom of sleeve 2, the sleeve 2 is normally tapered in such a way that it is thicker at its bottom than at its top. Heat source 1 does not directly contact base plate 3; rather, there is an open space 4 separating source 1 and plate 3. r(x) is the outer radius of the sleeve at any point along the x axis. $r_1$ is the inner radius of the sleeve, and is a constant. Thus the sleeve's inner diameter is a cylinder, i.e., the sleeve has been "cylindrically hollowed". $t_1$ is the thickness of the sleeve at its top (x=0) end, and $t_2$ is the thickness of the sleeve at its bottom (x=L) end. For a sleeve having uniform thickness at top and bottom, $t_1 = t_2$. The thickness t(x) of the tapered sleeve at any point along the x axis is given by:

$$t(x) = t1 + \frac{t2 - t1}{L} x \tag{1}$$

The outer radius r(x) of the sleeve at any point along the x axis is given by:

$$r(x) = r1 + t(x) \tag{2}$$

The cross-sectional area At(x) of the planar slice formed by slicing the sleeve orthogonal to its longitudinal axis is given by:

$$At(x) = \pi[r^2(x) - (r1)^2] \tag{3}$$

The amount of heat q(x) in watts (or BTU/hr) passing through the sleeve at distance x from the top in a downward dirction is given by:

$$q(x) = \frac{Qx}{L} \tag{4}$$

where Q is the total heat rejected from heat source 1. From Fourier's law of heat conduction, we know that $$Q(x) = -k \cdot At(x) \frac{dT}{dx} \tag{5}$$

where k is a function of the material used for sleeve 2 and gives the heat transfer property (thermal conductivity) of the material chosen, in watts/cm·° C. (or BTU/hr·in·°F.).

Substituting equations 1–4 into equation 5 and integrating yields:

$$\Delta T \bigg|_{x=0}^{x=L} = \frac{-QL(Ft)}{\pi k} \tag{6}$$

where Ft is an "area factor" with units in 1/cm² (or 1/in²). For purposes of this invention, one may assume that Q, L, and k are constants and known for each application. Ft is the area factor for the tapered sleeve and is derived from the above to be:

$$Ft = \frac{1}{2(t2 - t1)^2} \ln \frac{(t2)^2 + 2r1t2}{(t1)^2 + 2r1t1} \\ - \frac{(r1 + t1)}{2r1(t2 - t1)^2} \ln \frac{t2(2r1 + t1)}{t1(2r1 + t2)} \tag{7}$$

We see from equation 6 that there is a linear relationship between the temperature gradient ΔT (which defines the heat transfer capability of the sleeve) and the area factor Ft. For an ideal sleeve, ΔT = 0.

The volume of the tapered sleeve Vt is given by:

$$Vt = \pi L[1/3(t2-t1)^2 + r1(t1+t2) + t1t2] \tag{8}$$

For a uniform sleeve, the area Au of the slice obtained by orthogonally cutting across the longitudinal axis of the source/sleeve is given by:

$$Au = \pi t2(2r1 + t2) \tag{9}$$

This of course is a constant over the length of the cylinder, i.e., for all x. As for the tapered sleeve, q(x) for the uniform thickness sleeve is:

$$q(x) = Qx/L \tag{10}$$

and $$q(x) = -kA \, dt/dx \tag{11}$$

Substituting equations 9 and 10 into equation 11 and integrating yields $$\Delta T \bigg|_{x=0}^{x=L} = \frac{-QL(Fu)}{\pi k} \tag{12}$$

where Fu is an area factor for the uniform sleeve having units 1/cm² (or 1/in²) and is found to be:

$$Fu = \frac{1}{2t2(2r1 + t2)} \tag{13}$$

The volume of the uniform thickness sleeve is given by Vu where:

$$vu = L;90 \, [(r1 + t2)^2 - (r1)^2] \tag{14}$$

The weight of the sleeve is the volume V of the sleeve times d, its material density. Thus we can see that for both the tapered and the uniform thickness sleeve, there is a linear relationship between the weight of the sleeve and its volume per unit length, since length L is a constant.

Equations 7, 8, 13 and 14 were plotted and graphically portrayed on a graph as shown in FIG. 3 by assuming a set of values for t1 and t2 and plotting the results. The inner radius R1 of the sleeve was a constant 1.750 inches.

The first set of curves is a set of roughly parallel curves which travel from northwest to southeast on FIG. 3. Each curve represents a constant value of t1. The horizontal axis for this set of curves measures the value of t2 in inches and the vertical axis (read along the left scale) measures the area factor F in 1/in². The solid curves represent sleeves having tapered thickneses. The dotted curve represents sleeves having a uniform thickness, i.e., t1 = t2. Note that the area factor F is proportional to the temperature gradient ΔT for both tapered sleeves and sleeves of uniform thickness.

The second set of curves on FIG. 3 proceeds from southwest to northeast. Again, each curve represents a constant value of t1. The solid curves represent tapered sleeves and the dotted line represents uniform thickness sleeves, i.e., t1 = t2. The horizontal axis for this set of curves is the same as for the first set, namely, t2 in inches. However, the vertical axis is measured along the right of the page and is V/L measured in (inches)² V/L is proportional to sleeve weight for all tapered and uniform thickness sleeves.

It is known from the prior art that given the underlying assumption that the heat source has a uniform heat generating propensity along its cylindrical surface, a tapered sleeve will have the best heat transfer capability. What is surprising and what may be learned by examining FIG. 3 is that for a given heat transfer capability, a tapered sleeve, as opposed to a sleeve of uniform thickness, will also have the lowest weight. This is an important result for the case where the heat source is a battery cell used to generate electrical power for a spacecraft.

Let us verify the above statement by selecting an arbitrary F and comparing the weight for a tapered sleeve versus that for a uniform thickness sleeve. For example, let F equal 5.00 in⁻². Assume t1 = 0.010 inches. Then t2 = .0405 inches and V/L = 0.280 in². For a uniform thickness sleeve having the same F, t1 = t2

=0.0285 in. and V/L =0.318 in². Since the V/L for the uniform thickness sleeve is 13.6% higher than the V/L for the tapered sleeve, the weight of the uniform thickness sleeve is 13.6% greater than that for the tapered sleeve. For any F and for any t1 selected for the tapered sleeve, the weight of the uniform thickness sleeve is greater than that for the tapered sleeve. This can be verified by examining the geometry of the curves of FIG. 3.

FIG. 3 can be used in many ways by the design engineer. If one selects any F and either a t1 or a t2, the curves will yield the t which has not been specified, plus V/L. Similarly, if one selects V/L and one of the t's, then the other t as well as F will be determined. Furthermore, if one selects t1 and t2, F and V/L will be generated. F is simply related to the heat conduction capability and V/L is simply related to the weight.

Using the data contained in FIG. 3 it is possible to construct other sleeves with minimum weight given F (or $\Delta T$), or with minimum F (or $\Delta T$) (i.e., maximum heat transfer capability) given sleeve weight (or V/L).

IF we fix F and vary t1 over the range allowed by manufacturing constraints, we generate a new set of data, V/L as a function of t1. Such a curve is shown in FIG. 4a, where again R1 was 1.750 inches and F was chosen to be 5.00 in$^{-2}$. We then observe the minimum of this curve. This point gives us the t1 which will yield the minimum weight for the given F. Either set of curves of FIG. 3 then gives us the t2 for this F and t1. Thus, we have completely specified the parameters for a weight minimized sleeve having a given F or heat transfer capability.

Similarly, FIG. 4b shows V/L as a function of t2 for the fixed F of 5.00 in$^{-2}$ with R1 =1.750 inches. The low point of this curve gives us the t2 which yields the minimum weight for the given F. The corresponding t1 is obtained from either set of curves of FIG. 3.

Note that FIGS. 4a and 4b verify that the uniform thickness sleeve does not give the minimum weight; this is true for any F.

FIG. 5 shows the results of fixing V/L and allowing t1 (FIG. 5a) and t2 (FIG. 5b) to vary over the set of values which is feasible within manufacturing constraints. V/L is 0.30 in² and again R1 =1.750 inches for both FIGS. 5a and 5b. FIG. 5a is a curve of F as a function of t1, and FIG. 5b is a curve of F as a function of t2.

The lowest point on the FIG. 5a curve gives the t1 associated with the greatest heat transfer capability (lowest F and $\Delta T$). Then we obtain from either set of curves of FIG. 3 the t2 corresponding to this point. We have thus generated all the parameters necessary to enable us to construct a sleeve having the best heat transfer capabilities for a given weight.

Similarly, the lowest point of the FIG. 5b curve gives the t2 associated with the best heat transfer capability for a given weight. Either set of curves of FIG. 3 then give us the t1 associated with this t2.

Note that FIGS. 5a and 5b again verify that the uniform thickness sleeve does not give the best heat transfer capability; this is true for sleeves of any weight.

The above description is included to illustrate the operation of the preferred embodiments and is not meant to limit the scope of the invention. The scope of the invention is to be limited only by the following claims. From the above discussion, many variations will be apparent to one skilled in the art tht would yet be encompassed by the spirit and scope of the invention.

What is claimed is:

1. A weight-minimized heat-transfer sleeve adapted for use in an outer space environment to conduct a preselected amount of heat Q away from a heat source which fits substantially uniformly snugly within the sleeve throughout substantially the entire length L of the sleeve to a heat sink at one end of said sleeve, said sleeve having a preselected temperature gradient $\Delta T$ between first and second ends, made of a preselected material which has a given thermal conductivity k and density d, said sleeve further having a cylindrical inner opening with a preselected length L and radius R1, having a substantially linear outer diameter taper from its first end to its second end along its longitudinal axis, said taper and said sleeve end remote from said sink being thermally isolated from said environment and fabricated by a weight-minimizing method comprising the steps of:

generating a function describing how the weight W of the sleeve varies with respect to the thickness of its first end for said given $\Delta T$ and R1;

examining said weight-versus-first-end-thickness function to determine J, where J is the thickness of said first end at which said weight W is a minimum;

determining K from a set of functions $(\Delta T = -QLF/\pi k$ and $$W = \pi dL((\tfrac{1}{3})(t2 - t1)^2 + r1(t1 + t2) + t1t2), \text{ where}$$

$$F = \frac{1}{2(t2 - t1)^2} \ln \frac{(t2)^2 + 2r1t2}{(t1)^2 + 2r1t1}$$

$$- \frac{(r1 + t1)}{2r1(t2 - t1)^2} \ln \frac{t2(2r1 + t1)}{t1(2r1 + t2)},$$

t1 is the sleeve thickness at one of said first and second ends, and t2 is the sleeve thickness at the other of said first and second ends) linking temperature gradient $\Delta T$, weight W, first end thickness, and second end thickness, where K is the thickness at the sleeve's second end which corresponds to J for said preselected temperature gradient $\Delta T$ and said minimum weight W; and fabricating the sleeve with thickness J at said first end and thickness K at said second end.

2. A temperature-gradient-minimized heat-transfer sleeve adapted for use in an outer space environment to conduct a preselected amount of heat Q away from a heat source which fits substantially uniformly snugly within the sleeve throughout substantially the entire length L of the sleeve to a heat sink at one end of said sleeve, said sleeve having first and second ends, having a preselected eight W, made of a preselected material which has a given thermal conductivity k and density d, said sleeve further having a cylindrical inner opening with a preselected length L and radius R1, having a substantially linear outer diameter taper from its first end to its second end along its longitudinal axis, said taper and said sleeve end remote from said sink being thermally isolated from said environment, and fabricated by a method for minimizing the temperature gradient $\Delta T$ between said first and second ends, said method comprising the steps of:

generating a function describing how said temperature gradient $\Delta T$ varies with respect to the thickness of said first end for said given W and R1;

examining said temperature gradient-versus-first-end thickness function to determine M, where M is the thickness of said first end at which said temperature gradient $\Delta T$ is a minimum;

determining N from a set of functions $(\Delta T = -QLF/\pi k$ and $W = \pi dL((\tfrac{1}{3})(t2 - t1)^2 + r1(t1 + t2) + t1t2)$, where $$F = \frac{1}{2(t2-t1)^2} \ln \frac{(t2)^2 + 2r1t2}{(t1)^2 + 2r1t1} - \frac{(r1+t1)}{2r1(t2-t1)^2} \ln \frac{t2(2r1+t1)}{t1(2r1+t2)},$$

t1 is the sleeve thickness at one of said first and second ends, and t2 is the sleeve thickness at the other of said first and second ends) linking temperature gradient $\Delta T$, weight W, first end thickness, and second end thickness, where N is the thickness at the sleeve's second end which corresponds to M for said preselected weight W and said minimum temperature gradient $\Delta T$; and fabricating the sleeve with thickness M at said first end and thickness N at said second end.

* * * * *

UNITED STATES PATENT AND TRADEMARK OFFICE
CERTIFICATE OF CORRECTION

PATENT NO. : 4,828,022

DATED : May 9, 1989

INVENTOR(S) : Charles W. Koehler and Gerrit VanOmmering

It is certified that error appears in the above-identified patent and that said Letters Patent is hereby corrected as shown below:

In Column 6, line 53, delete "eight" and insert in place thereof --weight--.

Signed and Sealed this

Sixteenth Day of January, 1990

Attest:

JEFFREY M. SAMUELS

Attesting Officer     Acting Commissioner of Patents and Trademarks